United States Patent
Sims et al.

(10) Patent No.: US 6,985,523 B2
(45) Date of Patent: Jan. 10, 2006

(54) METHOD AND SYSTEM FOR ADAPTIVE EQUALIZATION FOR RECEIVERS IN A WIDE-BAND SATELLITE COMMUNICATIONS SYSTEM

(75) Inventors: Richard Sims, Walkersville, MD (US); Richard Clewer, Ijamsville, MD (US); Neal Becker, Frederick, MD (US); Yezdi Antia, Gaithersburg, MD (US); J. Mark Steber, Frederick, MD (US)

(73) Assignee: Hughes Electronics Corp., El Segundo, CA (US)

( * ) Notice: Subject to any disclaimer, the term of this patent is extended or adjusted under 35 U.S.C. 154(b) by 659 days.

(21) Appl. No.: 10/043,775

(22) Filed: Jan. 10, 2002

(65) Prior Publication Data

US 2002/0137510 A1 Sep. 26, 2002

Related U.S. Application Data

(60) Provisional application No. 60/260,740, filed on Jan. 10, 2001.

(51) Int. Cl.
*H03K 5/159* (2006.01)

(52) U.S. Cl. ...................................................... 375/232
(58) Field of Classification Search ................. 375/229, 375/231, 232, 233, 234, 350; 708/323; 333/18, 333/28 R
See application file for complete search history.

(56) References Cited

U.S. PATENT DOCUMENTS

| | | | | |
|---|---|---|---|---|
| 3,659,229 A | * | 4/1972 | Milton | ......................... 333/18 |
| 5,018,166 A | * | 5/1991 | Tjahjadi et al. | .............. 375/232 |
| 5,654,765 A | * | 8/1997 | Kim | ........................... 348/614 |
| 5,790,597 A | * | 8/1998 | Kurokami et al. | ........... 375/233 |
| 6,661,594 B2 | * | 12/2003 | Satoh et al. | ................... 360/65 |

\* cited by examiner

*Primary Examiner*—Don N. Vo
(74) *Attorney, Agent, or Firm*—John T. Whelan

(57) ABSTRACT

An apparatus for providing automatic gain control for use in a satellite terminal of a satellite communication system capable of transmitting a plurality of different modes of data. The apparatus includes a demodulator circuit having an analog to digital converter; a first variable attenuator having an attenuation value set on the basis of a measured power level of a predetermined data signal; and a second variable attenuator having an attenuation value set on the basis of the mode of data being received by the satellite terminal, where each of the data modes have a corresponding predetermined attenuation value associated therewith which is utilized as the attenuation value of the second variable attenuator when the satellite terminal receives the data mode.

15 Claims, 9 Drawing Sheets

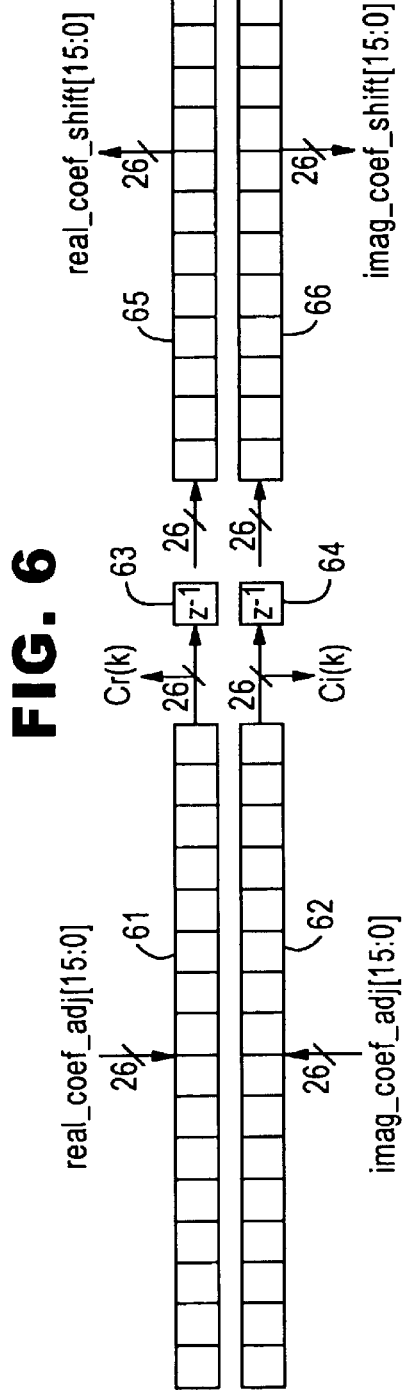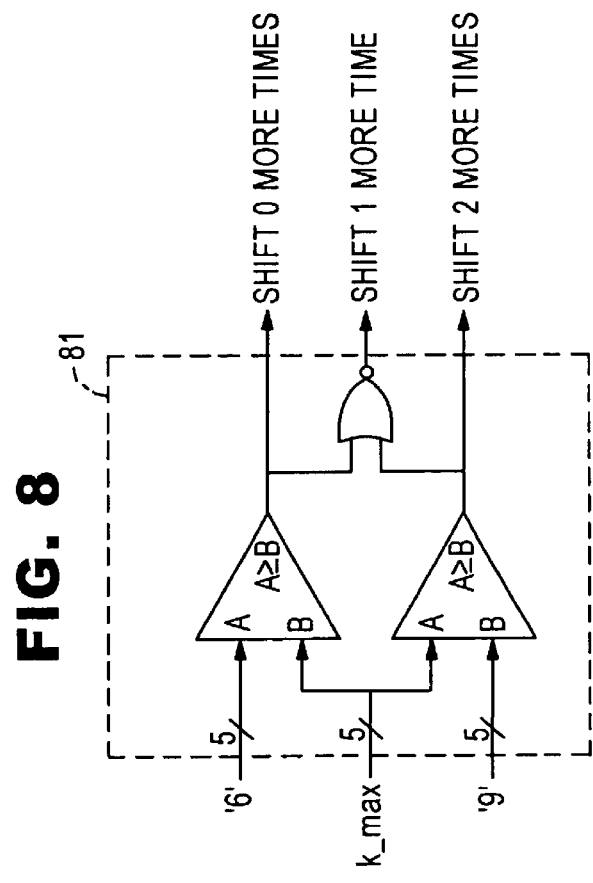

| CURRENT FILTER COEF | C0 | C0 | C0 | C1 | C1 | C1 | C4 | C4 | C4 | C7 | C7 | C7 | C11 | C11 | C11 | C14 |
|---|---|---|---|---|---|---|---|---|---|---|---|---|---|---|---|---|
| CELL FILTER BUFFER [0] | C1 | C2 | C3 | C4 | C5 | C6 | C7 | C8 | C9 | C10 | C11 | C12 | C13 | C14 | C15 | C16 | C17 |
| CELL FILTER BUFFER [1] | - | C1 | C2 | - | C4 | C5 | - | C7 | C8 | - | C10 | C11 | C12 | - | C14 | C15 | - |
| CELL FILTER BUFFER [2] | - | - | C1 | - | - | C4 | - | - | C7 | - | - | C10 | C11 | - | - | C14 | - |

| 13° SCAN ANGLE | DEGRADATION (dB) |
|---|---|
| WITH MICROCELL ADDRESS VALIDATOR | 1.0 |
| WITHOUT MICROCELL ADDRESS VALIDATOR | 1.7 |

METHOD AND SYSTEM FOR ADAPTIVE EQUALIZATION FOR RECEIVERS IN A WIDE-BAND SATELLITE COMMUNICATIONS SYSTEM

RELATED APPLICATIONS

This application claims priority under 35 U.S.C. §119(e) to provisional application Ser. No. 60/260,740 filed Jan. 10, 2001.

FIELD OF THE INVENTION

The present invention relates to a method and apparatus for demodulating wideband modulated data signals for use in satellite communication systems and more particularly, to a method and apparatus for effecting equalization of incoming data signals so as to compensate for amplitude and phase variations inherent in such wideband data channels.

BACKGROUND OF THE INVENTION

In known prior art satellite communication systems, the downlink data channels (i.e., transmission of data from the satellite to the satellite terminal) typically utilized bandwidths on the order of 20 MHz or less. In such systems, due to the narrow bandwidth being utilized, there was no need to provide for equalization in the demodulator/modem portion of the receiver, as the amplitude and phase distortions of the components where substantially constant.

However, as the need for additional bandwidth in the downlink data channels of satellite communication systems becomes necessary in order for such systems to provide various applications (e.g., high internet access capability) to end users, there is also a need to provide equalization in the demodulator/modem portion of receiver channel of the system, as signal phase and amplitude distortions become significant over a wideband channel. This is due to the fact that when utilizing channel bandwidths on the order of 500 MHz, there is significant amplitude and phase variations across the channel. These amplitude and phase distortions must be negated and/or compensated for in order for proper receipt and demodulation of the incoming data signal.

Furthermore, these distortions must be compensated for in a cost effective manner, which does not result in the satellite terminal becoming a non-commercially viable product. For example, while standard coaxial cable is sufficient for use with narrow bandwidth systems, it suffers from the foregoing problems when utilized in a wide bandwidth system (e.g. 500 MHz). However, while cables having constant amplitude and phase distortion over such wide bandwidths exist, such cables cannot be utilized in a commercially viable product as the cost of such cables is prohibitively expensive.

Accordingly, there exists a need for a cost effective method and apparatus for equalizing the incoming wideband data signal to compensate for amplitude and phase variations in the demodulator/modem portion of the receiver over the given bandwidth.

SUMMARY OF THE INVENTION

The present invention relates to a method and apparatus for providing a cost effective adaptive equalizer technique in the demodulator/modem portion of the satellite terminal in order to mitigate the effects of the satellite and the terminal amplitude and phase nonlinearities contained in the demodulation section of the satellite terminal.

More specifically, the present invention relates to an apparatus for providing adaptive equalization of a receiver channel of a satellite terminal of a satellite communication system. The apparatus includes a digital filter comprising a first register for receiving input data signals and a second register for receiving a set of filter coefficients, where the digital filter is operative for multiplying the input data signals contained in the first register by the set of coefficients contained in the second register, and generating a set of output signals on the basis of the result of the multiplication between the input data signals and the set of filter coefficients. The apparatus future includes an equalizer coupled to the digital filter so as to receive the set of output signals generated by the digital filter as an input signal. The equalizer is operative for adapting the set of filter coefficients so as to generate an updated set of filter coefficients which function to modify the performance of the filter to compensate for phase and amplitude variations in the input data signals. The apparatus also includes a tap-shifting circuit coupled to the equalizer so as to receive the updated set of filter coefficients. The tap-shifting circuit is operative for analyzing the updated set of filter coefficients so as to identify the most significant coefficients, and for shifting the location of the coefficients such that the most significant coefficients are located substantially in the center of the second register when the updated set of filter coefficients are placed in the second register.

In addition, the present invention relates to a method for providing adaptive equalization of a receiver channel of a satellite terminal of a satellite communication system. The method comprises the steps of: (1) filtering input data signals utilizing a set of filter coefficients so as to generate a set of output signals, the filter coefficients being located in a coefficient register; (2) coupling the set of output signals to an equalizer operative for adapting the set of filter coefficients so as to generate an updated set of filter coefficients, the updated set of filter coefficients functioning to modify the performance of the filter to compensate for phase and amplitude variations in the input data signals; and (3) analyzing said updated set of filter coefficients so as to identify the most significant coefficients, and for shifting the location of the filter coefficients such that said most significant coefficients are located substantially in the center of said coefficient register when said updated set of filter coefficients are placed in said coefficient register.

As described below, the method and apparatus of providing adaptive equalization of the demodulation portion of the satellite terminal in accordance with the present invention provides important advantages over prior art devices. Most importantly, the method and apparatus of the present invention allows for the mitigation of the effects of the satellite and the terminal amplitude and phase nonlinearities contained in the demodulation section of the satellite terminal in a cost effective manner.

Additional advantages of the present invention will become apparent to those skilled in the art from the following detailed description of exemplary embodiments of the present invention.

BRIEF DESCRIPTION OF THE DRAWINGS

FIGS. 6–8 illustrate an exemplary embodiment of a serial implementation of the tap-shifting algorithm performed by the tap-shifting circuit.

Figure 1:
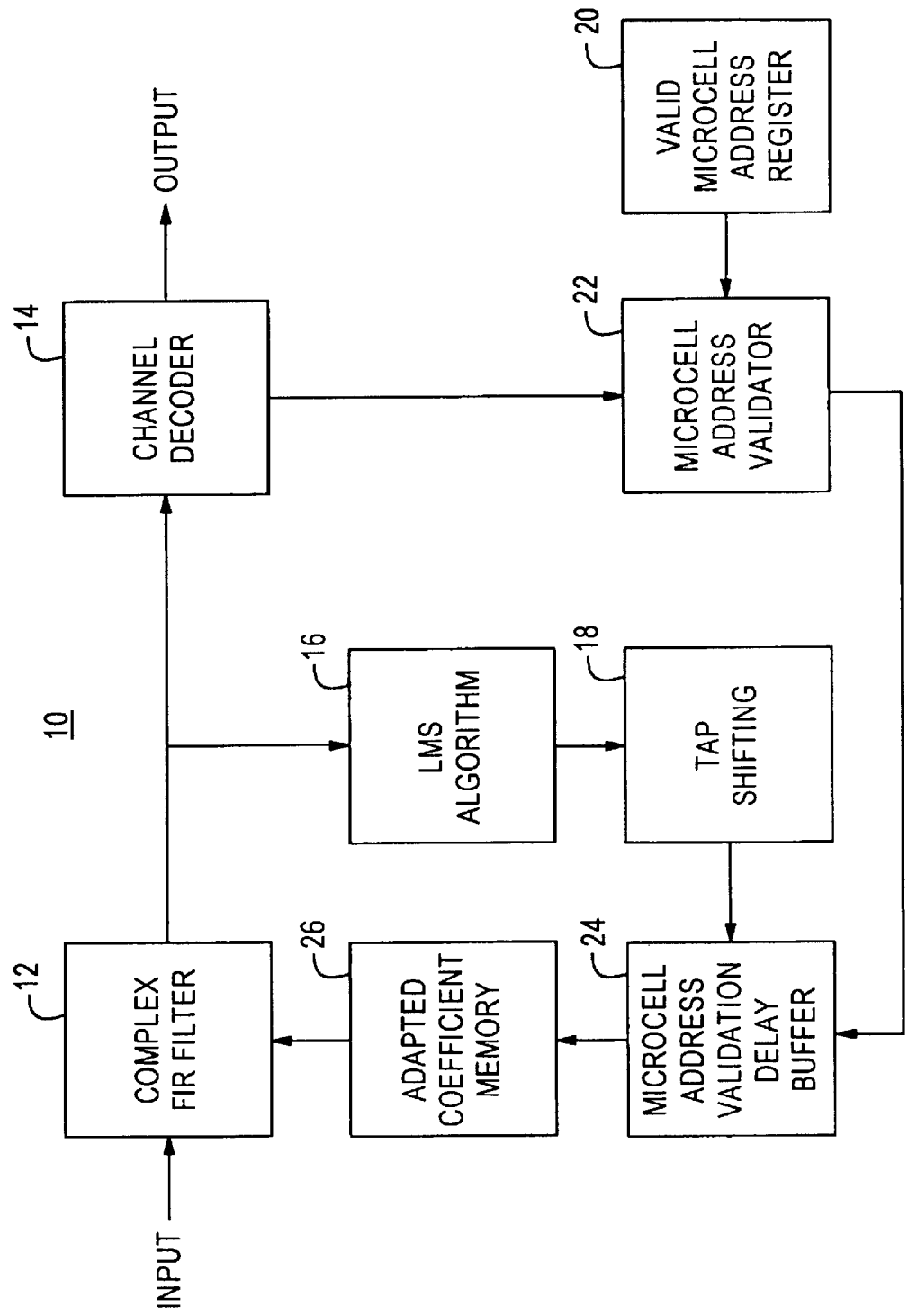
FIG. 1 is a block diagram of an exemplary satellite terminal utilized in a satellite communication system.

The invention itself, together with further objects and attendant advantages, will best be understood by reference to the following detailed description, taken in conjunction with the accompanying drawings.

DETAILED DESCRIPTION OF THE DRAWINGS

The following detailed description of the novel adaptive equalization technique utilized in a satellite communication system sets forth exemplary embodiments of the present invention. It is noted, however, that the present invention as claimed herein is not intended to be limited to the specific embodiments disclosed in the following discussion. Clearly other implementations of the novel equalization technique for use with satellite communication systems, as well as other communication systems, are possible.

It is noted that the operation of the present invention is described in conjunction with the operation of a satellite communication system. It is also noted, however, that the present invention can be utilized with essentially any wideband satellite communication system, and is not limited to the specific embodiments or description set forth herein especially as they pertain to the system described.

As noted above, the present invention relates to an equalization process utilized during the demodulation of satellite transmitted wideband modulated signals. In the exemplary system utilized to illustrate the present invention, the satellite terminal functions to demodulate a 500 MHz wide QPSK signal on a Ka-band (19.7–20.2 GHz) downlink.

The present invention compensates for, among other things, frequency response variations due to "beam squint", which results from the use of a phased-array antenna to form downlink spot beams directed to physical locations called microcells. Specifically, "beam squint" generates a frequency response variation which varies in accordance with the scan angle of the phased-array antenna. It is further noted that the present invention also compensates for degradation caused by the satellite terminal, which severely degrades the downlink waveform due to the amplitude and phase nonlinearity of the receive low noise block (LNB), the interfacility link (IFL) cabling, and other wideband filtering associated with the downconversion process.

In accordance with the present invention, as explained in detail below, the satellite terminal employs an adaptive LMS equalizer technique in order to mitigate the effects of the satellite and the terminal amplitude and phase nonlinearities contained in the demodulation section of the satellite terminal.

The utilization of LMS equalizer techniques are well known and have previously been employed for terrestrial and line-of-sight modems. LMS equalization techniques have not been widely applied to traditional satellite communications demodulators. When attempting to implement a standard LMS equalization technique in the demodulator of the wideband satellite communication system, the inventors of the present invention discovered that two issues/problems arose that prevented the utilization of the standard LMS equalization technique. It is the solution of these issues that resulted in the novel adaptive equalizer technique of the present invention.

The first issue relates to the use of an equalizer with a demodulator that is estimating timing offset on a burst by burst basis, as is typically done in a satellite communication system. The timing offset estimation is derived from a correlation of the received burst preamble unique word with a local copy of the unique word. When the received burst preamble is time-aligned with the local copy of the unique word, the correlation peaks. The location of this correlation peak in time can be used to determine the burst's time of arrival, and therefore the timing offset from the optimal sampling point, which can be removed, for example, with a polyphase interpolating filter.

The problem/issue arises because the data samples from the received burst pass through the matched filter/equalizer FIR filter of the demodulator before they are passed through the "unique word" correlator. Specifically, assuming that the timing estimator is operating perfectly, and the timing corrections are performed perfectly, as the LMS algorithm runs, the FIR filter taps adapt, and the group delay of the equalizer will change slightly. The unique word of the next burst is then passed through the FIR filter with the newly adapted coefficients with a slight timing shift. As a result of this change in filter group delay, the unique word correlation peak will be slightly shifted in time, and the timing estimate will be relative to the group delay of the current equalizer FIR coefficients. Therefore, the time shift in the FIR filter coefficients persists. Accordingly, over time, the timing shift will behave as a "random-walk", because there are only a finite number of FIR filter taps. Thus, eventually the timing shift in the FIR coefficients will drift too much, and demodulator performance will suffer.

In order to prevent this undesirable "random-walk", as explained in detail below, a novel tap-shifting algorithm is utilized to modify the output of the LMS algorithm. In accordance with the operation of the tap-shifting algorithm, at the end of each burst, a search is conducted for the largest/major tap of the filter, by comparing the coefficient magnitude at each tap location. It is preferable that the major tap be located near the center of the FIR filter so as to prevent the foregoing "random-walk" problem that degrades performance. If the timing has drifted such that the major tap is too far from the center, the tap-shifting algorithm functions to shift the coefficients to the left or right as necessary to move the major tap toward the center of the FIR filter. As a result, the tap-shifting algorithm negates the foregoing "random-walk" problem, and prevents degradation of demodulator performance due to such timing errors.

The second issue noted by the inventors of the present invention concerns "beam squint". As noted above, "beam squint" generates a frequency response variation which varies in accordance with the scan angle of the phased-array antenna. As such, the frequency response varies in accordance between downlink beams directed to adjacent microcells. A problem arises in that if the given satellite terminal (located, for example, at the edge of a microcell) is unable to distinguish bursts from beams directed to the microcell in which the given satellite terminal is physically residing, from bursts from beams destined to adjacent microcells, it is possible that the demodulator of the given satellite terminal would incorrectly train its equalizer, resulting in a degradation in performance. This is due to the fact that the equalizer would adapt to the average of the beam squint frequency response variations from beams actually intended for the given satellite terminal, as well as from beams directed to adjacent microcells (which are not intended for the given satellite terminal). It is noted that the foregoing problem would result in a degradation of the demodulator's BER and PLR performance.

In order to prevent satellite terminals from training their equalizers based on beams from adjacent microcells, the present invention utilizes satellite transmitted downlink microcell address information to confirm that a given burst is intended for the given microcell prior to allowing the satellite terminal to update its equalizer coefficients. In other words, the satellite terminal of a given microcell is only permitted to adapt its coefficients based on bursts from beams correctly directed towards the microcell in which the satellite terminal resides.

FIG. 1 is a block diagram of an exemplary demodulator in accordance with the present invention. It is noted that only the portions of the demodulator relevant to the present invention are illustrated in FIG. 1. Referring to FIG. 1, the components contained in the demodulator 10 include a complex FIR filter 12, which essentially comprises an equalizer and a matched filter and which functions to maximize the signal/noise ratio of the signal input into a channel decoder 14. The channel decoder 14, which can comprise a standard carrier recovery loop, viterbi and Reed-Solomon decoders, receives the output of the complex FIR filter 12 as an input signal. The output of the channel decoder 14 is the decoded data signal.

The output of the complex FIR filter 12 is also input into a LMS algorithm circuit 16, which as explained below, functions to implement a standard LMS algorithm on the data output by the FIR filter 12. The output of the LMS algorithm circuit 16 is coupled to a tap-shifting circuit 18. As explained above, and further below, the tap-shifting circuit 18 functions to maintain the largest coefficient value in a position approximate the center of the FIR filter 12.

The demodulator 10 further includes a valid microcell address register 20, a microcell address validator 22, a microcell address validation delay buffer 24 and an adapted coefficient memory 26. As explained in more detail below, these components function to verify that the received burst signal was intended for the microcell in which the given satellite terminal resides before allowing the filter coefficients to be updated.

Figure 2:
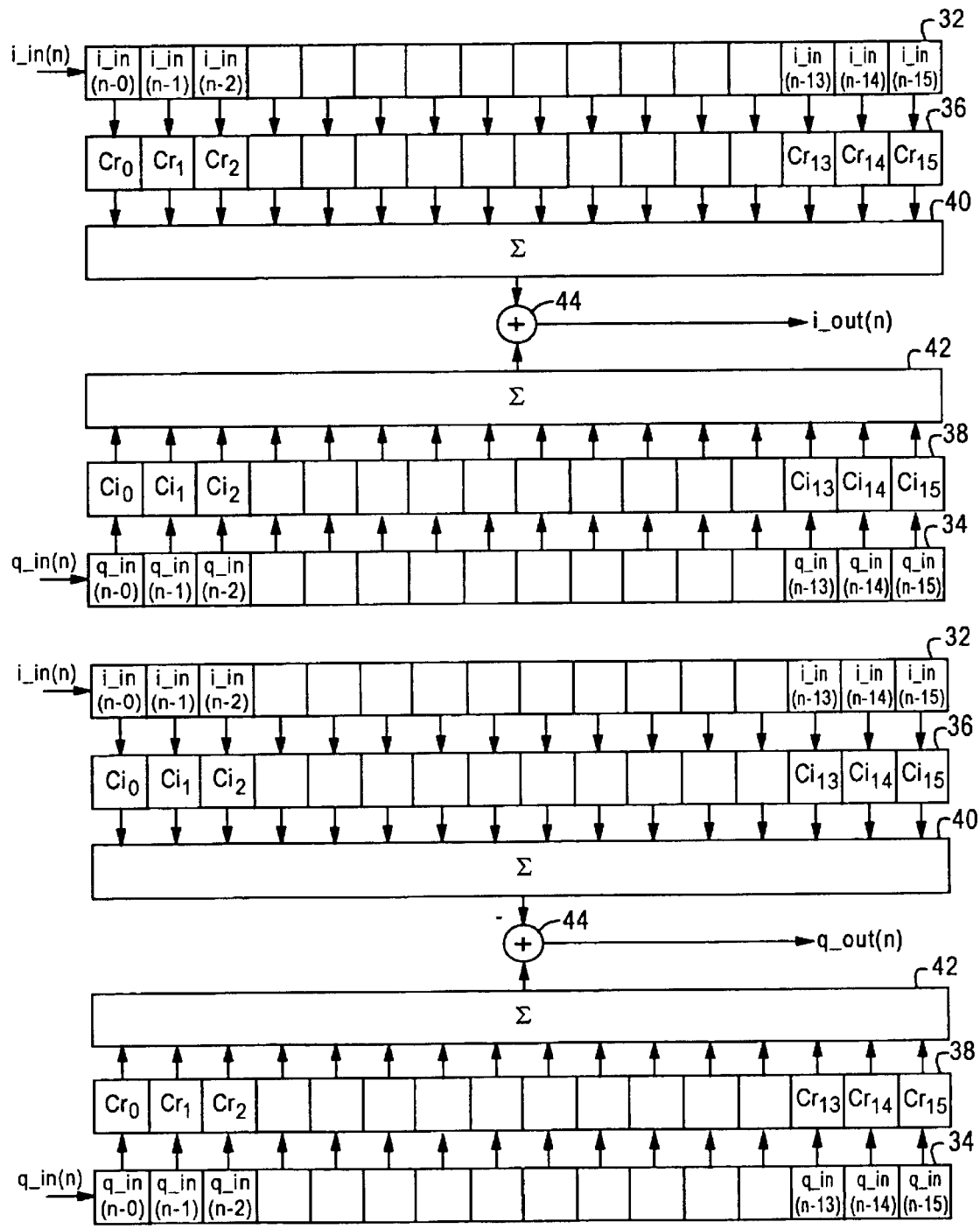
FIG. 2 illustrates an exemplary serial implementation of the complex FIR filter depicted in FIG. 1.

The operation of the foregoing components of the demodulator are now described in detail. FIG. 2 illustrates an exemplary serial implementation of the complex FIR filter 12. Referring to FIG. 2, the complex FIR filter receives I and Q data samples, (i_in(n)) and (q_in(n)), as input signals and generates filtered I and Q output data streams, (i_out(n)) and (q_out(n)). The i_out(n) data stream is generated by inputting the I and Q data samples into respective shift registers 32 and 34, and then multiplying the data samples contained in the shift registers 32 and 34 by the filter coefficients contained in the respective registers 36 and 38. Summers 40 and 42 function to add the results obtained from the multiplication of the respective data samples with the respective coefficients, and the summer 44 functions to add the outputs summers 40 and 42 together to generate i_out(n) data stream. The q_out(n) data stream is generated in the same manner with the exception that summer 44 functions to subtract the output of summer 40 from the output of summer 42.

The filter output of the complex filter is given by:

$$i\_out(n) = \sum_{k=0}^{N-1} [i\_in(n-k) \cdot Cr_k(n) + q\_in(n-k) \cdot Ci_k(n)]$$

$$q\_out(n) = \sum_{k=0}^{N-1} [q\_in(n-k) \cdot Cr_k(n) - i\_in(n-k) \cdot Ci_k(n)]$$

where:

n is the sample count of the burst.

i_out(n) and q_out(n) are the I and Q filter outputs at time n.

N is the length of the filter in taps.

i_in (n-k) and q_in(n-k) are the data contained in the $k^{th}$ tap of the I and Q channel shift registers at time n.

$Cr_k(n)$ and $Ci_k(n)$ are the real and imaginary parts of the $k^{th}$ filter coefficient at time n.

The FIR filter 12 coefficients are updated by means of the LMS algorithm circuit 16. In the given embodiment, the set of leakage (nominally square-root raised cosine) coefficients are not changed. Further, because of hardware speed constraints, the equalizer filter 12 coefficients are not updated on a symbol basis. Instead the coefficient adjustments are updated on a once per symbol basis during the adaptation interval at the end of the burst. The algorithm for coefficient adaptation is illustrated in FIGS. 3(a)–5(b). It is noted that the start and length of the adaptation interval are set with processor registers.

Figure 3A:
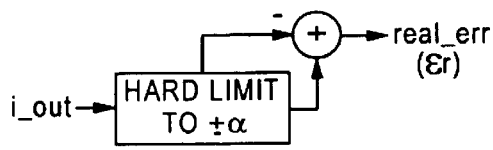
FIGS. 3a and 3b illustrate an exemplary embodiment of the LMS error calculation circuitry.
Figure 3B:
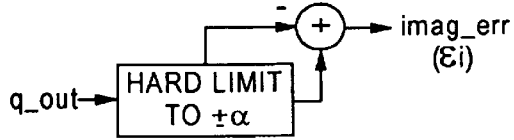

FIGS. 3a and 3b illustrate an exemplary embodiment of the LMS error calculation circuitry. The coefficient adjustments, $\phi r_k$ and $\phi i_k$ are held at zero until the adaptation interval begins. At each symbol during the adaptation interval, the real and imaginary error signals are calculated as:

$$\epsilon r(n) = \alpha sgn[i\_out(n)] - i\_out(n)$$

$$\epsilon i(n) = \alpha sgn[q\_out(n)] - q\_out(n)$$

where:

n is the symbol count of the burst.

□r(n) and □i(n) are the real and imaginary parts of the LMS error at time n.

□□ is the desired nominal output level of the equalizer filter.

i_out(n) and q_out(n) are the optimal samples of the complex FIR output, occurring at time n.

sgn(x) is the sign of x.

Figure 4A:
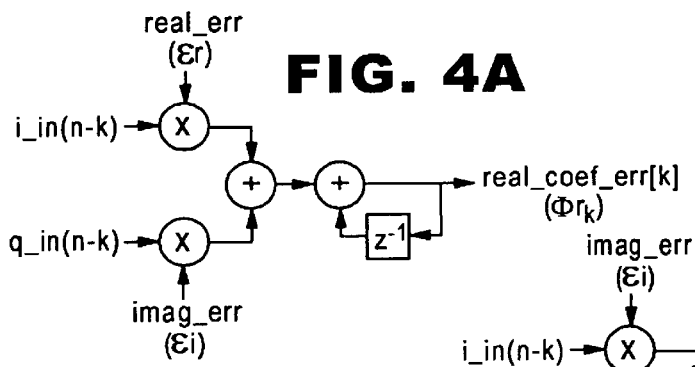
FIGS. 4a and 4b illustrate an exemplary embodiment of LMS error accumulation circuitry.
Figure 4B:
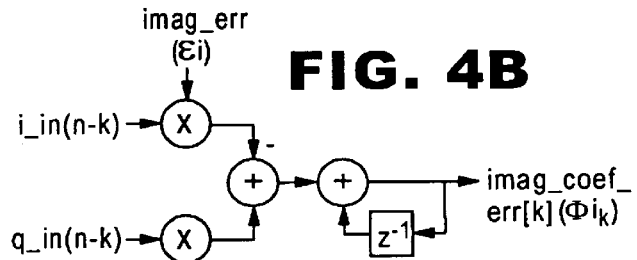

FIGS. 4a and 4b illustrate an exemplary embodiment of LMS error accumulation circuitry. Each symbol, the coefficient adjustments to each of the N taps are updated as:

$$\Phi r_k(n) = \Phi r_k(n-1) + [\epsilon r(n) \cdot i\_in(n-k) + \epsilon i(n) \cdot q\_in(n-k)]$$

$$\Phi i_k(n) = \Phi i_k(n-1) + [\epsilon r(n) \cdot q\_in(n-k) - \epsilon i(n) \cdot i\_in(n-k)]$$

where:

□$r_k$(n) and □$i_k$(n) are the real and imaginary parts of the adjustment to the $k^{th}$ equalizer filter tap at time n.

i_in and q_in are the inputs to the complex FIR.

k is the filter tap index in the range [0,N−1].

Figure 5A:
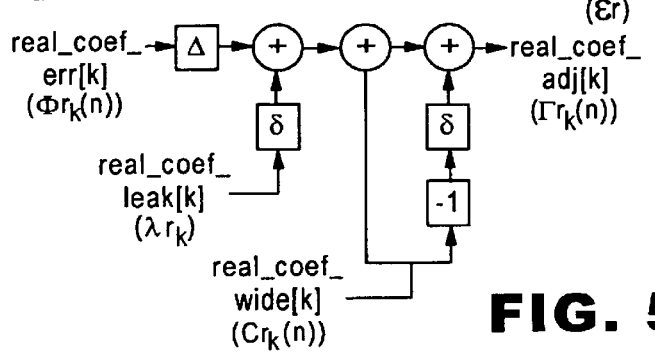
FIGS. 5a and 5b illustrate an exemplary embodiment of the modified LMS algorithm coefficient update circuitry.
Figure 5B:
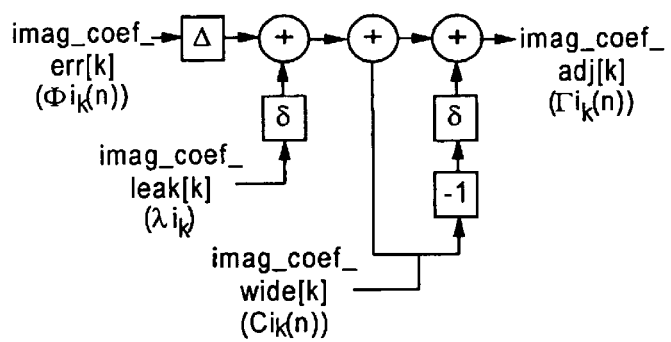

FIGS. 5a and 5b illustrate an exemplary embodiment of the modified LMS algorithm coefficient update circuitry. At the end of the burst adaptation interval, the coefficient adjustments are applied to generate the adapted set of coefficients:

$$\Gamma r_k(m) = (1-\delta) \cdot Cr_k(m) + \delta \cdot \lambda r_k + \Delta \cdot \Phi r_k(m)$$

$$\Gamma i_k(m) = (1-\delta) \cdot Ci_k(m) + \delta \cdot \lambda i_k + \Delta \cdot \Phi i_k(m)$$

where:

m is the burst count.

$\Gamma r_k(m)$ and $\Gamma i_k(m)$ are the $k^{th}$ taps of the adapted filter coefficients following the $m_{th}$ burst.

$Cr_k(m)$ and $Ci_k(m)$ are the real and imaginary parts of the $k^{th}$ taps of the filter coefficients used during the $m^{th}$ burst.

$\lambda r_k(0)$ and $\lambda i_k(0)$ are the real and imaginary parts of the $k^{th}$ taps of the leak set of filter coefficients.

☐ is the LMS adaptation gain.

☐ is the leak gain.

As illustrated in FIG. 2 and noted above, the output of LMS algorithm circuit 16 is coupled to the tap-shifting circuit 18. In operation, the N coefficients of the LMS equalizer 16 are then passed through the tap-shifting circuit 18 which functions to prevent the main coefficients from drifting too far from the center of the filter 12. This is necessary because the timing estimate at the beginning of the burst is measured relative to the group delay in the equalizer. Any timing errors (changes in group delay) acquired by the equalizer coefficients persist from burst to burst, causing the timing error to behave as a random walk. The first step in the algorithm implemented by the tap-shifting circuit 18 is to find the location of the main taps by comparing the magnitudes of the taps. The main tap is defined as:

$$\tilde{k} = \underset{k \in [0, N-1]}{\operatorname{argmax}} (\Gamma r_k^2 + \Gamma i_k^2)$$

In the current embodiment, because the equalizer has an even number of taps, N=16, the main tap is allowed to be in the range of [7,8]. Accordingly, if $\tilde{k}$ is outside of this range, the coefficients are shifted left or right one tap as defined by:

$$\Psi r_k(m) = \begin{cases} \Gamma r_{k-1}(m) & \tilde{k} \leq 6 : \text{Right shift} \\ \Gamma r_k(m) & \tilde{k} \in [7, 8] : \text{No shift} \\ \Gamma r_{k+1}(m) & \tilde{k} \geq 9 : \text{Left shift} \end{cases}$$

$$\Psi i_k(m) = \begin{cases} \Gamma i_{k-1}(m) & \tilde{k} \leq 6 : \text{Right shift} \\ \Gamma i_k(m) & \tilde{k} \in [7, 8] : \text{No shift} \\ \Gamma i_{k+1}(m) & \tilde{k} \geq 9 : \text{Left shift} \end{cases}$$

where:

$\Psi r_k(m)$ and $\Psi i_k(m)$ are the $k^{th}$ taps of the shifted filter coefficients following the $m^{th}$ burst.

$\tilde{k}$ is the location of the (center of the) main tap(s).

It is noted that coefficients at the tail of the filter, where no value is available to shift into those positions, will be given a value of 0.

Figure 7:
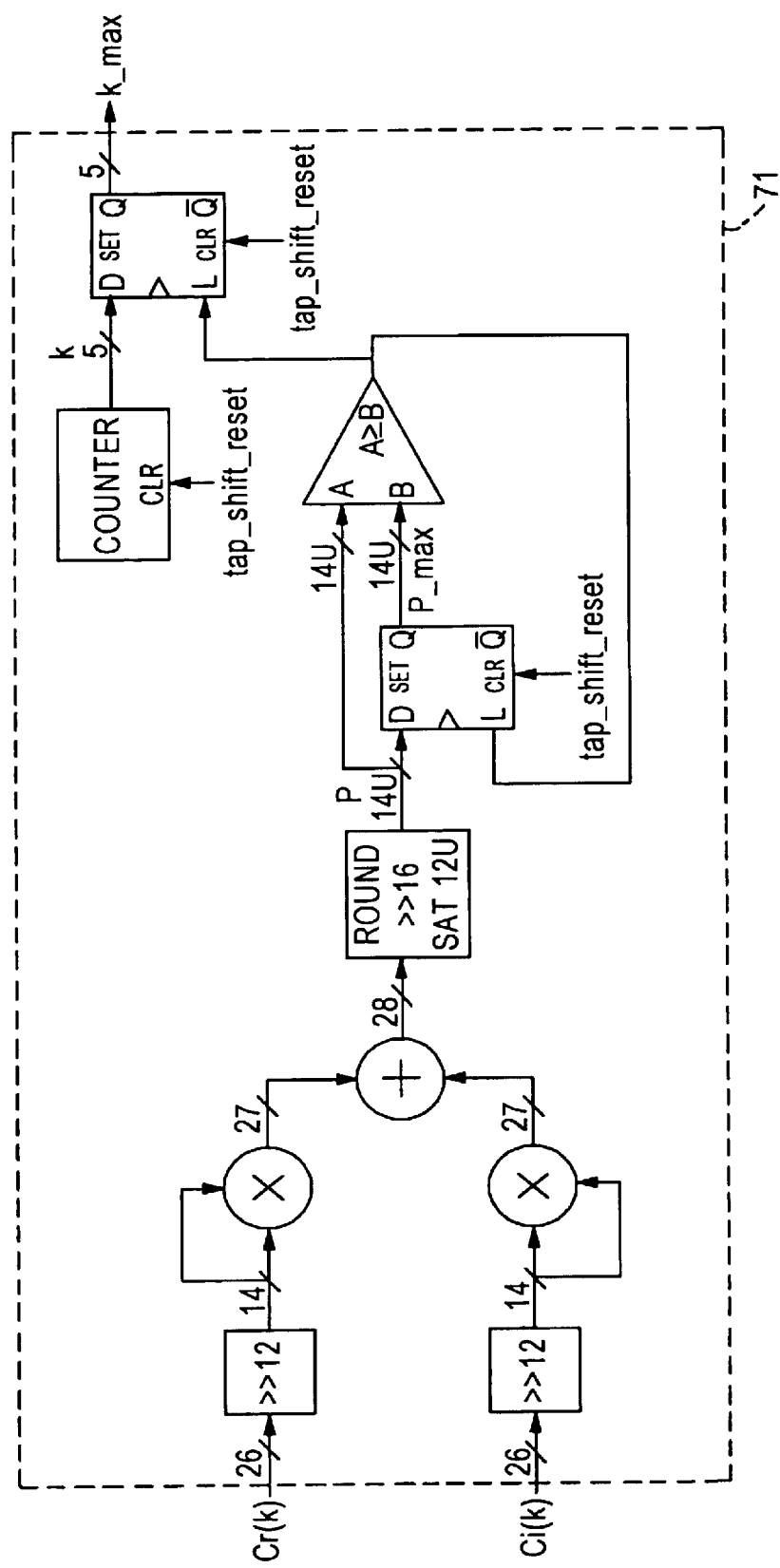

FIGS. 6–8 illustrate an exemplary embodiment of a serial implementation of the tap-shifting algorithm performed by the tap-shifting circuit 18. In operation, processing begins after the real/imag_coef_adj (Γr/Γi) are computed and stored in real_coef_adj buffer 61 and the imag_coef_adj buffer 62. The real/imag_coef_adj (Γr/Γi) are right shifted out of the real_coef_adj buffer 61 and the imag_coef_adj buffer 62 into respective delay buffers 63 and 64, and then into the real_coef_shift buffer 65 and the imag_coef_shift buffer 66 once per clock, k. The foregoing is illustrated in FIG. 6.

Referring to FIG. 7, once per clock, k, the power of the current tap (Cr(k) and Ci(k)) is calculated and shifted into a coefficient power buffer, which forms part of the maximum tap power detection circuit 71 illustrated in FIG. 7. As each coefficient power, Cr(k) and Ci(k), is shifted in, the current (average) power is compared to the maximum power of all previous samples. If the power of the current tap is greater, it is latched as the new maximum power, k_max, and the current shift count is also latched. On count k=15, when 15 of the 16 coefficients have been shifted into the real/imag_coef_shift buffers 65 and 66, a decision is made on how to proceed based on the index of the maximum (average) coefficient power. This decision is performed by the tap-shift centering circuit 81 illustrated in FIG. 8.

Referring to FIG. 8, a coefficient peak would occur at the center taps, which are taps 7 and 8 in the given example. If k_max is less than or equal to 6, then the coefficient peak occurs in indices 9 to 15, and no more shifts are required to move the peak closer to the center taps. If k_max is greater than or equal to 9, then the coefficient peak occurs in indices 0 to 6, and two extra shifts are required to move the peak closer to the center taps. If k_max is 7 or 8, then one extra shift is required. The output of the tap-shift centering circuit 81 is utilized to shift (if necessary) the coefficients in the real/imag_coef_shift buffers 65 and 66. Once any necessary shift has been performed, the contents (i.e., coefficients) of the real/imag_coef_shift buffers 65 and 66 are output to the microcell address validation delay buffer 24.

As noted above, satellite communication systems typically utilize phased array antennas to form spot beams directed at the receiver. In such systems, the half power beam width covers one "microcell" and therefore, receivers outside of the microcell can receive significant signal power and burst detection is a definite probability. In addition, phased array antennas exhibit a phenomenon called "beam squint" which causes frequency response variations across the beam.

Thus, burst detections of out-of-microcell bursts would therefore cause the equalizer of a given satellite terminal to attempt to converge on severely distorted signals. Over time, the equalizer would tend to adapt to the average frequency response error, which means that the signals of interest may not have the optimum equalization coefficients. The performance of the demodulator would suffer as a result. The microcell address validator 22 of the present invention is utilized to solve this problem.

Referring again to FIG. 1, in accordance with the present invention, each burst contains microcell address information (i.e., cell addresses) in the headers of the data packets contained in the burst which enable discrimination of the destination microcell. In other words, the satellite terminal can determine from the cell address whether or not the given burst was intended for the microcell in which the given satellite terminal resides. The microcell address validator circuit 22 performs the function of confirming the cell address associated with each burst. As shown in FIG. 1, the microcell address validator circuit 22 receives data information from the channel decoder 14 each burst. This data information includes the microcell address associated with the burst. The microcell address validator circuit 22 also receives the microcell address of the given satellite terminal, which is stored in the valid microcell address register circuit 20. The microcell address validator circuit 22 compares the address of the given satellite terminal with the received microcell address and if a match occurs then the updated filter coefficients output by the tap-shifting circuit 18 are stored in the adapted coefficient memory 26 and utilized by the filter 12 in the next cycle.

It is noted that in the given embodiment, the microcell qualifier match decision is delayed well beyond the end of the burst in question due to the delay in the decoding process. The equalizer structure is modified in the following manner to permit cell address discrimination.

After completion of tap-shifting, the coefficients are shifted into a microcell qualification delay buffer 24 to await validation by the microcell address validator circuit 22. Because of decoding delays, the microcell qualification may take several bursts, so the buffer size must be sized to accommodate this delay. If microcell validation is successful (i.e., the address associated with the incoming burst and the microcell address stored in the microcell address register match), the new coefficients are transferred to the adapted coefficient memory 26. If microcell validation fails, the new coefficients are ignored, and the previous coefficients are reused.

When initialing training the equalizer, the initial channel distortions may be so severe that the channel coding is not powerful enough to correct the received packets, causing the microcell qualifier to fail. In such instances, the system functions to force the equalizer coefficients to adapt, regardless of the microcell validation. This forced adaptation is only utilized during initial terminal configuration.

Figure 9:
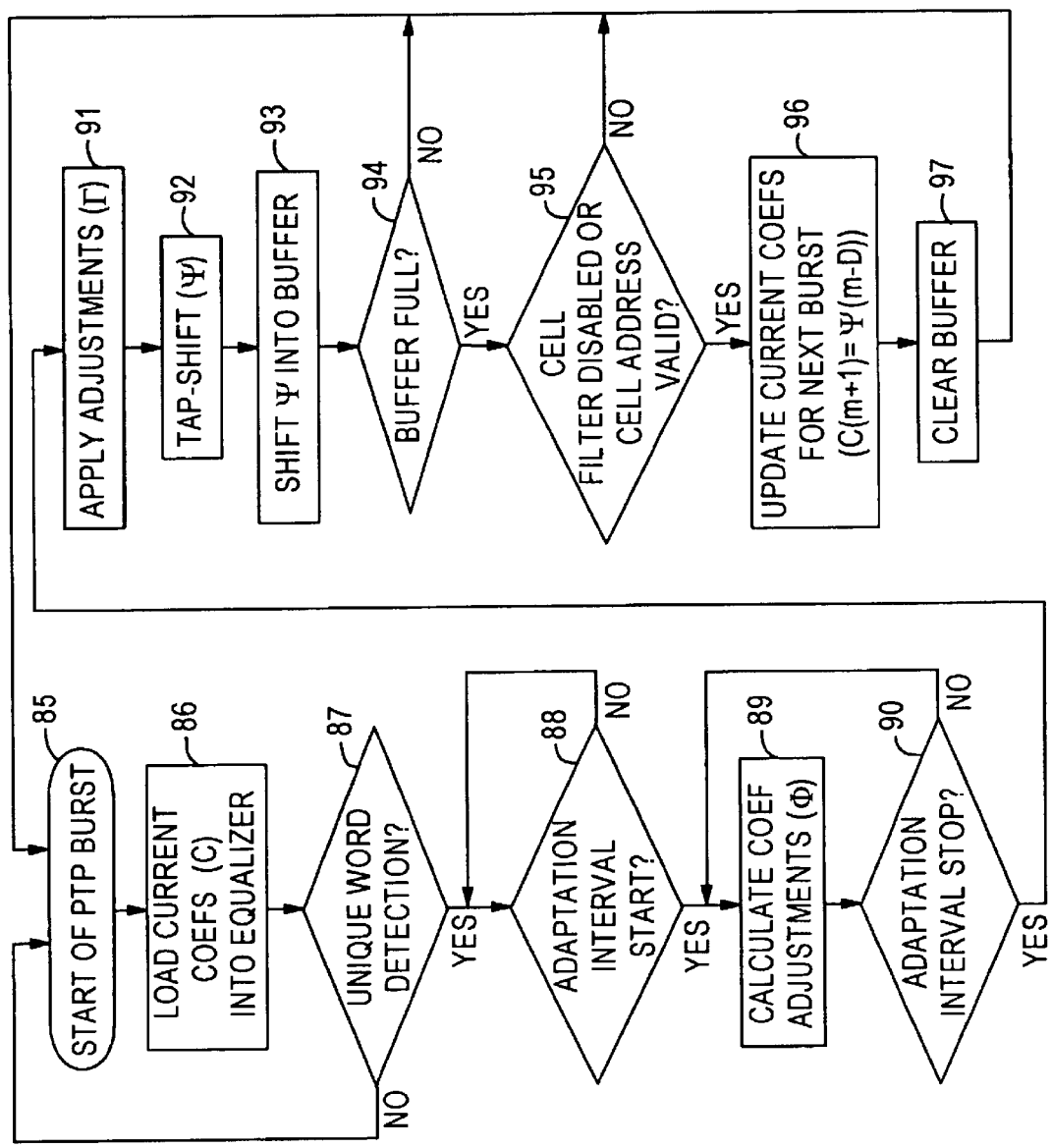
FIG. 9 is a flow chart illustrating an exemplary algorithm for performing coefficient updating.

FIG. 9 is a flow chart illustrating an exemplary algorithm for performing coefficient updating, which incorporates the foregoing initialization technique. Referring to FIG. 9, the algorithm is as follows.

- At the start of each burst (Step 85), the current set of coefficients are loaded into the equalizer (Step 86).
- If a unique word "UW" is detected (Step 87) then the equalizer will calculate the coefficient adjustments during the adaptation interval (Steps 88 and 89).
- If a UW is not detected (Step 87), then the equalizer does not adapt and system returns to Step 85 to wait for the start of the next burst.
- At the end of the adaptation interval (Step 90) for each detected burst, the adjusted, tap-shifted coefficients are calculated and shifted into the microcell address validation delay buffer (Steps 91, 92, 93 and 94).
- After a defined number of burst (D bursts), the microcell address validator signals whether the terminal's microcell address was found in the received packet's header (Step 95).
- If the cell address is valid or if microcell address validating has been disabled (during initial configuration) then the buffered coefficients replace the current coefficients (Step 96), and the contents of the microcell address validation buffer are cleared (Step 97).
- If the cell address is invalid then the buffered coefficients are ignored. The filter coefficients from the previous burst are reused. The contents of the microcell address validation buffer are not cleared, and the next set of coefficients in the buffer will be checked for microcell address validation.

The foregoing algorithm is embodied in the following equation:

$$Cr(m+1) = \begin{cases} \Psi r(m-D) & \text{microcell address validation passes,} \\ & \text{or microcell address validation disabled} \\ Cr(m) & \text{microcell address validation fails,} \\ & \text{or still waiting for validation} \end{cases}$$

$$Ci(m+1) = \begin{cases} \Psi i(m-D) & \text{microcell address validation passes,} \\ & \text{or microcell address validation disabled} \\ Ci(m) & \text{microcell address validation fails,} \\ & \text{or still waiting for validation} \end{cases}$$

where:
D is the number of bursts required for microcell address validation.

Figures 10, 12, 15:
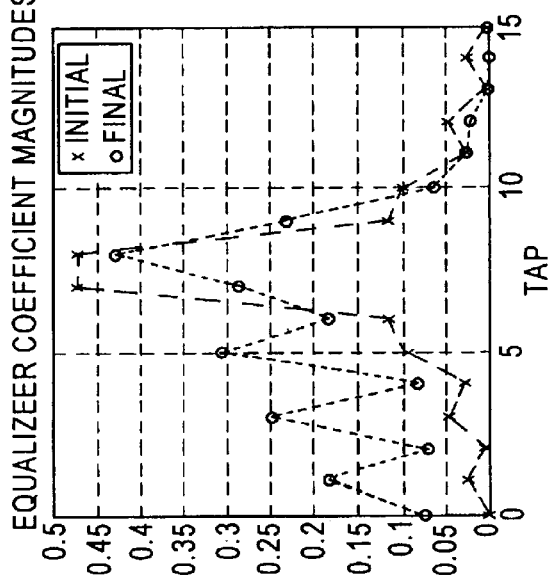
FIG. 10 illustrates an exemplary timeline of the current filter coefficients and the contents of the microcell address validation delay buffer.
FIGS. 11–12 illustrate simulation results of the adaptive equalization technique of the present invention.
FIGS. 13–15 illustrate simulation results of the microcell validation technique of the present invention.

FIG. 10 illustrates an exemplary timeline of the current filter coefficients and the contents of the microcell address validation delay buffer 24. Initially, coefficients C0 are used in the filter 12. During the first burst, the adapted coefficients C1 are determined, and placed at the beginning of the microcell address validation delay buffer 24. Then next burst, C0 continues to be used in the filter, and adapted coefficients C2 are shifted into the buffer 24. The next burst, C3 is shifted in, also based on C0. At this point, the microcell address validator 22 returns a valid flag for the first burst, corresponding to the adapted set C1. Therefore C1 becomes the current set of filter coefficients, replacing C0. The contents of the buffer 24 are cleared, so that a new set of adapted coefficients, based on C1, can be calculated. When an invalid cell address is found by the microcell address validator 22, shown as the shaded C10, the next set of coefficients in the buffer, C11 are utilized when validated.

Figure 11:
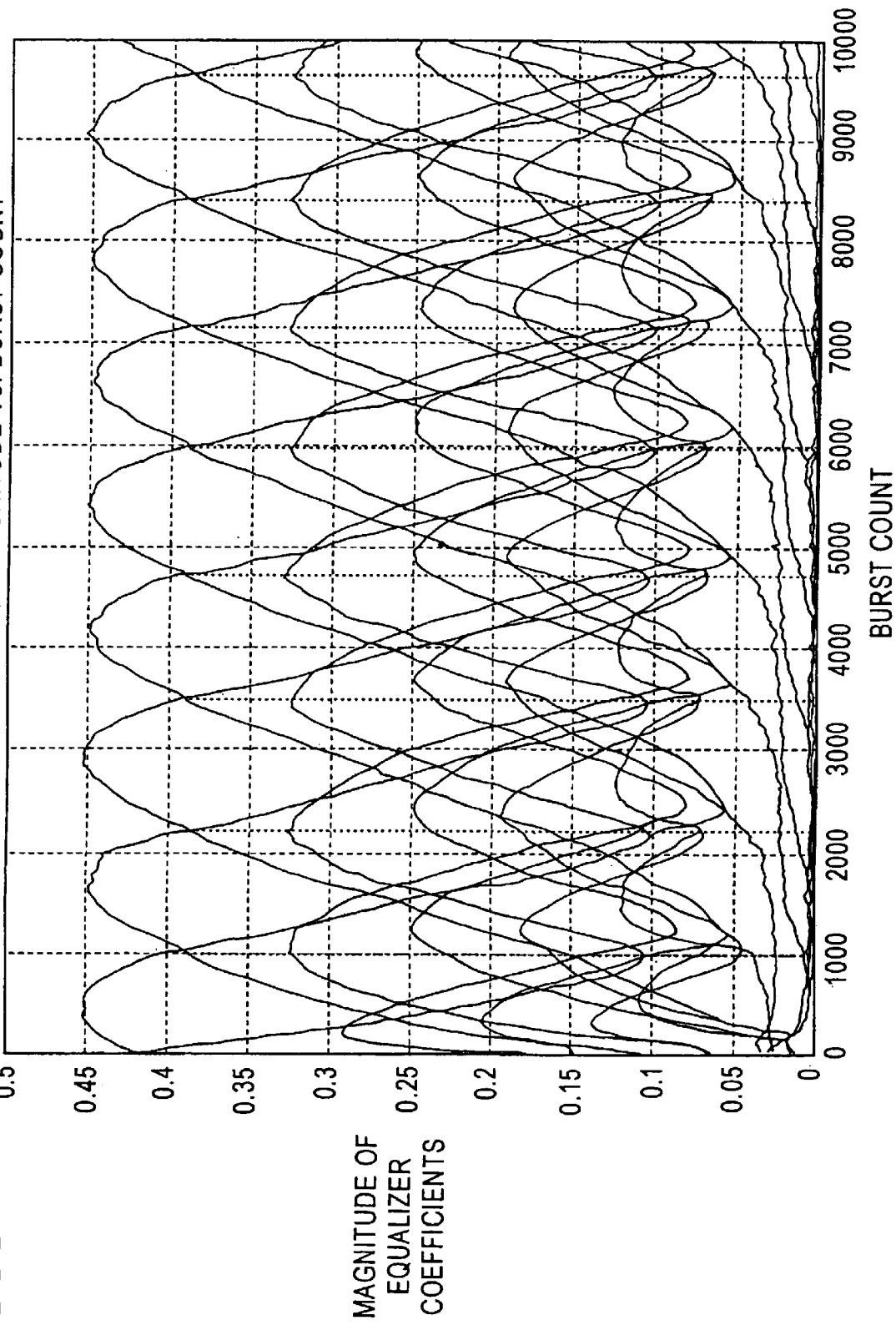

The foregoing adaptive equalization method of the present invention has been simulated. As illustrated below, the equalizer's adaptive LMS algorithm compensates for the frequency selective channel distortions expected in the system. FIGS. 11 and 12 illustrate the results of the tap-shifting and cell-filtering algorithms.

More specifically, FIG. 11 shows the coefficient magnitudes of the 16 equalizer taps vs. time (burst count). Each tap is represented by a different color. As shown, the coefficients display a timing drift caused by a bias in the timing estimator. The major tap drifts from near the center at tap 8 (shown in dark green) towards tap 9. Every 1000 or so bursts, the major tap drifts until tap 9 has larger magnitude than tap 8, at which time the tap-shifting algorithm shifts the major tap back to tap 8. FIG. 11 shows that the tap-shifting algorithm is robust with respect to coefficient group delay drift. FIG. 12 shows the 16 initial and final coefficient magnitudes from this test. The final taps 11–15 are near zero because the rate of coefficient drift was greater than the LMS algorithm's adaptation speed.

Figure 13:
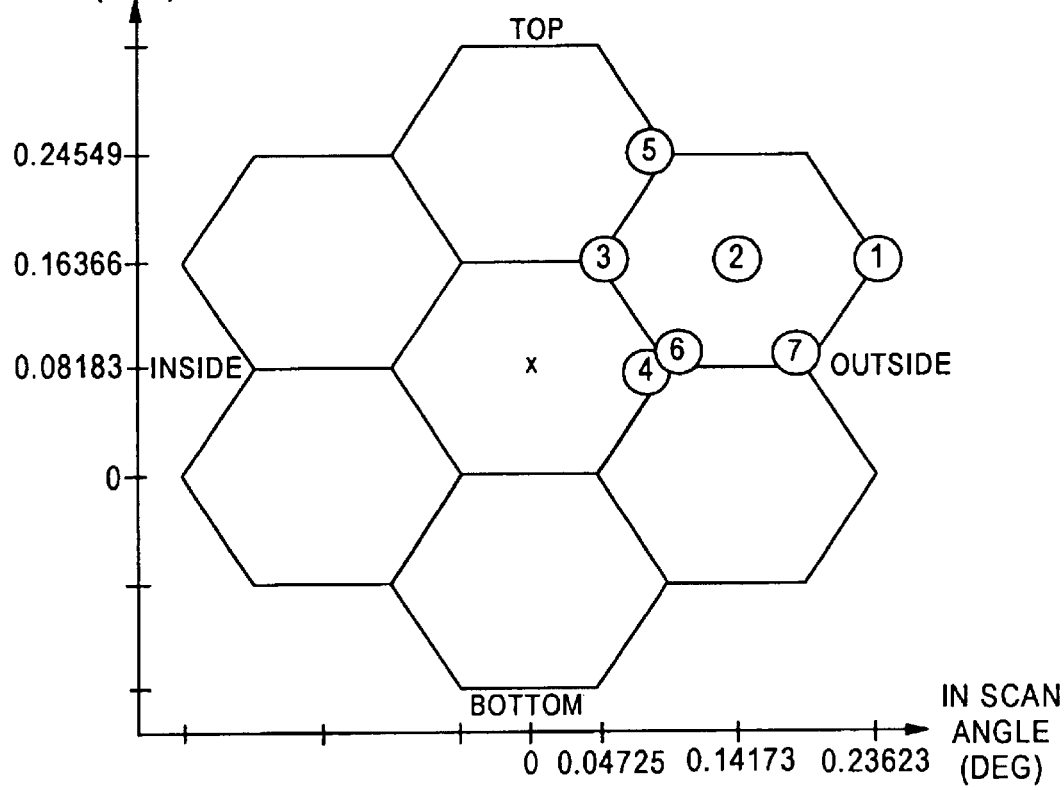
Figure 14:
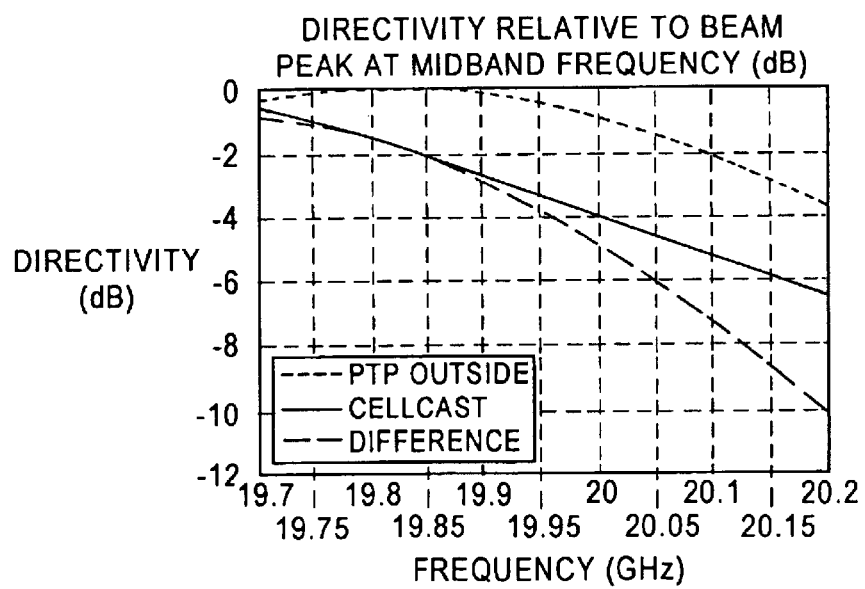

FIG. 13 illustrates an exemplary grouping of microcells. Cellcast bursts illuminate groups of seven cells such as this, but normal (PTP) bursts illuminate only a single microcell. It has been determined that the difference of amplitude distortions between cellcast and normal bursts due to beam squint is greatest at the geographical location labeled as 1. The PTP and cellcast gain slopes at test point 1 for a 13 degree scan angle are shown in FIG. 14. The difference between the gain slopes is also plotted. A simulation was utilized to test the demodulator's performance degradation at test point 1. As shown in FIG. 15, the degradation in performance was significantly less when utilizing the microcell validation technique of the present invention.

As described above, the method and apparatus of providing adaptive equalization of the demodulation portion of the satellite terminal in accordance with the present invention provides important advantages over prior art devices. Most importantly, the method and apparatus of the present invention allows for the mitigation of the effects of the satellite and the terminal amplitude and phase nonlinearities contained in the demodulation section of the satellite terminal in a cost effective manner.

Of course, it should be understood that a wide range of other changes and modifications can be made to the preferred embodiment described above. It is therefore intended that the foregoing detailed description be regarded as illustrative rather than limiting and that it be understood that it is the following claims including all equivalents, which are intended to define the scope of the invention.

What is claimed is:

1. An apparatus for providing adaptive equalization of a receiver channel of a satellite terminal of a satellite communication system, said apparatus comprising:

a digital filter comprising a first register for receiving input data signals and a second register for receiving a set of filter coefficients, said digital filter operative for multiplying said input data signals contained in said first register by said set of coefficients contained in said second register, said digital filter generating a set of output signals on the basis of the result of the multiplication between said input data signals and said set of filter coefficients;

an equalizer coupled to said digital filter so as to receive said set of output signals generated by said digital filter as input signal, said equalizer operative for adapting said set of filter coefficients so as to generate an updated set of filter coefficients, said updated set of filter coefficients functioning to modify the performance of said filter to compensate for phase and amplitude variations in said input data signals; and a tap-shifting circuit coupled to said equalizer so as to receive said updated set of filter coefficients, said tap-shifting circuit operative for analyzing said updated set of filter coefficients so as to identify the most significant coefficients, and for shifting the location of the coefficients such that said most significant coefficients are located substantially in the center of said second register when said updated set of filter coefficients are placed in said second register.

2. The apparatus of claim 1, wherein said digital filter is a FIR filter.

3. The apparatus of claim 1, wherein said equalizer is a LMS equalizer.

4. The apparatus of claim 1, wherein said input data signals have a bandwidth of 500 MHz.

5. The apparatus of claim 1, wherein said satellite communication system transmits said input data signals to said satellite terminal in a burst mode in which data is transmitted to said satellite terminal in distinct segments of time, each of which represents a single burst.

6. The apparatus of claim 5, further comprising a validation circuit operative for determining if said input data signals associated with a given burst were intended for said satellite terminal prior to allowing said updated set of coefficients to be placed in said second register.

7. The apparatus of claim 6, wherein said validation circuit compares a microcell address contained in said burst with a microcell address of the satellite terminal.

8. A method for providing adaptive equalization of a receiver channel of a satellite terminal of a satellite communication system, said method comprising the steps of:

filtering input data signals utilizing a set of filter coefficients so as to generate a set of output signals, said filter coefficients be located in a coefficient register;

coupling said set of output signals to an equalizer, said equalizer operative for adapting said set of filter coefficients so as to generate an updated set of filter coefficients, said updated set of filter coefficients functioning to modify the performance of said filter to compensate for phase and amplitude variations in said input data signals; and analyzing said updated set of filter coefficients so as to identify the most significant coefficients, and for shifting the location of the filter coefficients such that said most significant coefficients are located substantially in the center of said coefficient register when said updated set of filter coefficients are placed in said coefficient register.

9. The method of claim 8, wherein said filtering of said input data signals implements a FIR filter operation.

10. The method of claim 8, wherein said equalizer is a LMS equalizer.

11. The method of claim 8, wherein said input data signals have a bandwidth of 500 MHz.

12. The method of claim 8, wherein said satellite communication system transmits said input data signals to said satellite terminal in a burst mode in which data is transmitted to said satellite terminal in distinct segments of time, each of which represents a single burst.

13. The method of claim 12, further comprising a data validation step for determining if said input data signals associated with a given burst were intended for said satellite terminal prior to allowing said updated set of filter coefficients to be placed in said coefficient register.

14. The method of claim 13, wherein said data validation step comprises comparing a microcell address contained in said burst with a microcell address of the satellite terminal.

15. An apparatus for providing adaptive equalization of a receiver channel of a satellite terminal of a satellite communication system, said method comprising the steps of:

means for filtering input data signals utilizing a set of filter coefficients so as to generate a set of output signals, said filter coefficients be located in a coefficient register;

means for coupling said set of output signals to an equalizer, said equalizer operative for adapting said set of filter coefficients so as to generate an updated set of filter coefficients, said updated set of filter coefficients functioning to modify the performance of said filter to compensate for phase and amplitude variations in said input data signals; and means for analyzing said updated set of filter coefficients so as to identify the most significant coefficients, and for shifting the location of the filter coefficients such that said most significant coefficients are located substantially in the center of said coefficient register when said updated set of filter coefficients are placed in said coefficient register.

* * * * *